United States Patent
Haile

(10) Patent No.: US 12,216,625 B2
(45) Date of Patent: Feb. 4, 2025

(54) ELASTIC DATA SAMPLING IN A DATA PIPELINE

(71) Applicant: Data Culpa, Inc., Carlisle, MA (US)

(72) Inventor: J. Mitchell Haile, Carlisle, MA (US)

(73) Assignee: Data Culpa, Inc., Carlisle, MA (US)

( * ) Notice: Subject to any disclaimer, the term of this patent is extended or adjusted under 35 U.S.C. 154(b) by 162 days.

(21) Appl. No.: 17/875,185

(22) Filed: Jul. 27, 2022

(65) Prior Publication Data

US 2023/0040834 A1 Feb. 9, 2023

Related U.S. Application Data

(60) Provisional application No. 63/228,746, filed on Aug. 3, 2021.

(51) Int. Cl.
*G06F 16/215* (2019.01)
*G06F 9/50* (2006.01)
*G06F 16/23* (2019.01)

(52) U.S. Cl.
CPC ............ *G06F 16/215* (2019.01); *G06F 9/505* (2013.01); *G06F 16/2365* (2019.01)

(58) Field of Classification Search
CPC .... G06F 16/215; G06F 9/505; G06F 16/2365; G06F 16/26
See application file for complete search history.

(56) References Cited

U.S. PATENT DOCUMENTS

| | | | |
|---|---|---|---|
| 10,839,352 B1* | 11/2020 | Mitchell | G06Q 10/1057 |
| 2009/0113188 A1* | 4/2009 | Hattori | G06F 16/24542 |
| | | | 712/E9.004 |
| 2012/0089775 A1* | 4/2012 | Ranade | G06F 16/183 |
| | | | 711/170 |
| 2013/0227573 A1* | 8/2013 | Morsi | G06F 9/5083 |
| | | | 718/100 |
| 2020/0118653 A1* | 4/2020 | Hagenbuch | G16H 40/20 |
| 2020/0133533 A1* | 4/2020 | Zhao | G06F 3/0604 |
| 2021/0117425 A1* | 4/2021 | Rao | H04L 9/0866 |
| 2021/0248144 A1* | 8/2021 | Haile | H04L 43/062 |
| 2022/0230024 A1* | 7/2022 | Kallianpur | G06F 18/285 |

* cited by examiner

*Primary Examiner* — Maher N Algibhah

(57) ABSTRACT

Various embodiments comprise systems and methods to sample data outputs of a data pipeline. In some examples, data monitoring circuitry monitors the data pipeline wherein the data pipeline receives an input data set, processes the input data set, and responsively generates and transfers an output data set. The data monitoring circuitry ingests the output data set, determines an amount of available computing resources, and selects an amount of the values from the output data set based on the amount of available computing resources. The data monitoring circuitry generates a quality score for the selected values based on a data quality, generates a confidence score based on the amount of the selected values, and reports the quality score and the confidence score.

20 Claims, 7 Drawing Sheets

ELASTIC DATA SAMPLING IN A DATA PIPELINE

RELATED APPLICATIONS

This U.S. Patent Application claims priority to U.S. Provisional Patent Application 63/228,746 entitled "ELASTIC DATA SAMPLING IN A DATA PIPELINE" which was filed on Aug. 3, 2021, and which is incorporated by reference into this U.S. Patent Application in its entirety.

TECHNICAL BACKGROUND

A data pipeline comprises a series of data processing elements that intake data from a data source, process the input data for a desired effect, and transfer the processed data to a data target. Data pipelines are configured to intake data that comprises a known format for their data processing elements to operate accurately. When the input data to a data pipeline is altered, the data processing elements may not recognize the changes which can cause malfunctions in the operation of the data pipeline. Changes to input data often arise when the data sets are large which results in variety of technical issues when processing or ingesting data received through a data pipeline. Implicit schema and schema creep like typos or changes to schema often cause issues when ingesting data. Completeness issues can also arise when ingesting data. For example, completeness can be compromised when there is an incorrect count of data rows/documents, there are missing fields or missing values, and/or there are duplicate and near-duplicate data entries. Additionally, accuracy issues may arise when there are incorrect types in fields. For example, a string field that often comprises numbers is altered to now comprise words. Accuracy issues may further arise when there are incorrect category field values and incorrect continuous field values. For example, a continuous field may usually have distribution between 0 and 100, but the distribution is significantly different on updated rows or out of usual bounds. Data pipelines may have bugs which impact data quality and data pipeline code is difficult to debug.

Data pipeline monitoring systems are employed to counteract the range of technical issues that occur with data pipelines. Traditional data pipeline monitoring systems employ a user defined ruleset that governs what inputs and outputs for a data pipeline should look like. For example, the manually defined rulesets may indicate schemas, types, value ranges, and data volumes the inputs and outputs of data pipelines should have. The data monitoring systems ingest the inputs and outputs of a data pipeline and apply the manually defined rulesets to the inputs and outputs. When the inputs or outputs deviate from the manually defined rulesets, the data pipeline monitoring systems generate and transfer alerts to notify pipeline operators that a problem has occurred. The input and output data sets of the pipeline are often large and the data processing operations to compare the data sets to the rulesets can be computationally intensive. The computational intensity decreases the speed at with the pipeline monitoring systems analyze the inputs and outputs. Unfortunately, the data pipeline monitoring systems do not effectively and efficiently utilize available computing resources to analyze data sets generated by a data pipeline.

Overview

This Overview is provided to introduce a selection of concepts in a simplified form that are further described below in the Detail Description. This summary is not intended to identify key features or essential features of the claimed subject matter, nor is it intended to be used as an aid in determining the scope of the claimed subject matter.

Various embodiments of the present technology generally relate to solutions for maintaining data integrity of a data pipeline. Some embodiments comprise a data pipeline monitoring system configured to sample data outputs of a data pipeline. In the data pipeline monitoring system, data monitoring circuity monitors the data pipeline. The data pipeline receives an input data set, processes the input data set, and responsively generates and transfers an output data set. The data monitoring circuitry ingests the output data set and determines an amount of available computing resources. The data monitoring circuitry determines a sample size for the output data set based on the amount of available computing resources. The data monitoring circuitry selects values from the output data set based on the sample size. The data monitoring circuitry generates a quality score for the selected values based on a data quality and generates a confidence score based on the sample size. The data monitoring circuitry reports the quality score and the confidence score.

Some embodiments comprise a method of operating a data pipeline monitoring system to sample data outputs of a data pipeline. The method includes data monitoring circuity monitoring the data pipeline. The data pipeline receives an input data set, processes the input data set, and responsively generates and transfers an output data set. The method continues with data monitoring circuitry ingesting the output data set and determining an amount of available computing resources. The method continues with the data monitoring circuitry determining a sample size for the output data set based on the amount of available computing resources. The method continues with the data monitoring circuitry selecting values from the output data set based on the sample size. The method continues with the data monitoring circuitry generating a quality score for the selected values based on a data quality and generating a confidence score based on the sample size. The method continues with the data monitoring circuitry reporting the quality score and the confidence score.

Some embodiments comprise a non-transitory computer-readable medium storing instructions to sample data outputs of a data pipeline. The instructions, in response to execution by one or more processors, cause the one or more processors to drive a system to perform pipeline monitoring operations. The operations comprise monitoring the data pipeline. The data pipeline receives an input data set, processes the input data set, and responsively generates and transfers an output data set. The operations further comprise ingesting the output data set and determining an amount of available computing resources. The operations further comprise determining a sample size for the output data set based on the amount of available computing resources. The operations further comprise selecting values from the output data set based on the sample size. The operations further comprise generating a quality score for the selected values based on a data quality and generating a confidence score based on the sample size. The operations further comprise reporting the quality score and the confidence score.

DESCRIPTION OF THE DRAWINGS

Many aspects of the disclosure can be better understood with reference to the following drawings. The components in the drawings are not necessarily drawn to sale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
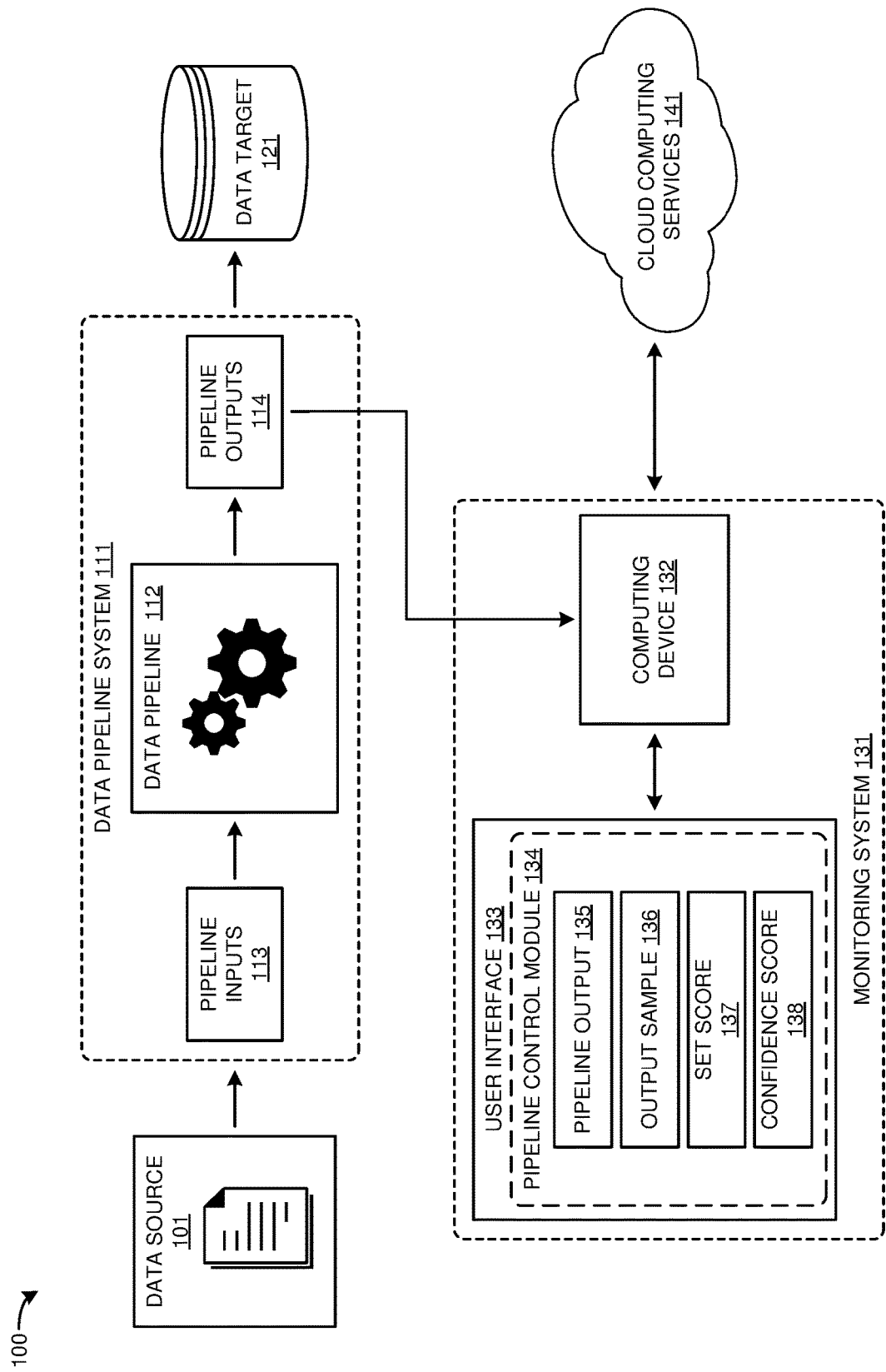
FIG. 1 illustrates an exemplary data processing environment to sample pipeline outputs.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology relate to solutions for monitoring the operations of data pipeline systems. More specifically, embodiments of the present technology relate to systems and methods for sampling data outputs generated by a data pipeline. Now referring to the Figures.

FIG. 1 illustrates data processing environment 100 to monitor operations of a data pipeline. Data processing environment 100 processes raw data generated by data sources into a processed form for use in data analytics, data storage, data harvesting, and the like. Data processing environment 100 comprises data source 101, data pipeline system 111, data target 121, monitoring system 131, and cloud computing services 141. Data pipeline system 111 comprises data pipeline 112, pipeline inputs 113, and pipeline outputs 114. Monitoring system 131 comprises computing device 132, user interface 133, pipeline control module 134, pipeline output 135, output sample 136, set score 137, and confidence score 138. In other examples, data processing environment 100 may include fewer or additional components than those illustrated in FIG. 1. Likewise, the illustrated components of data processing environment 100 may include fewer or additional components, assets, or connections than shown. Each of data source 101, data pipeline system 111, data target 121, monitoring system 131, and/or cloud computing services 141 may be representative of a single computing apparatus or multiple computing apparatuses.

Data source 101 is operatively coupled to data pipeline system 111. Data source 101 is representative one or more systems, apparatuses, computing devices, and the like that generate raw data for consumption by data pipeline system 111. Data source 101 may comprise a computing device of an industrial system, a financial system, research system, or some other type of system configured to generate data that characterizes that system. For example, data source 101 may comprise a computer affiliated with an online transaction service that generates sales data which characterizes events performed by the online transaction service. It should be appreciated that the type of data generated by data source 101 is not limited.

Data pipeline system 111 is operatively coupled to data pipeline source 101, data target 121, and monitoring system 131. Data pipeline system 111 is representative of a data processing system which intakes "raw" or otherwise unprocessed data from data source 101 and emits processed data configured for consumption by an end user. Data pipeline system 111 comprises data pipeline 112, pipeline inputs 113, and pipeline outputs 114. Pipeline inputs 113 comprise unprocessed data sets generated by data source 101. Pipeline outputs 114 comprise processed data sets generated by the one or more data processing operations implemented by data pipeline 112. Data pipeline 112 comprises one or more computing devices that are connected in series that intake pipeline inputs 113 received from data source 101, implement one or more processing steps on pipeline inputs 113, and generate pipeline outputs 114. For example, the computing devices of data pipeline 112 may ingest pipeline inputs 113 and execute transform functions on pipeline inputs 113. The execution of the transform functions alters pipeline inputs 113 into a consumable form to generate pipeline outputs 114. For example, pipeline inputs 113 may comprise data strings of non-uniform length and data pipeline 112 may parse the strings to form pipeline outputs 114. Upon generation of pipeline outputs 114, data pipeline 112 transfers pipeline outputs to data target 121. In some examples, data pipeline system 112 may transfer pipeline outputs 114 to computing device 132 to facilitate the monitoring operations of monitoring system 131.

Data target 121 is operatively coupled to data pipeline system 111. Data target 121 is representative of one or more computing systems comprising memory that receive pipeline outputs 114 generated by data pipeline 112. Data target 121 may comprise a database, data structure, data repository, data lake, another data pipeline, and/or some other type of data storage system. In some examples, data target 121 may transfer pipeline outputs 114 received from data pipeline system 111 to monitoring system 131 to facilitate the pipeline monitoring operations of monitoring system 131.

Monitoring system 131 is operatively coupled to data pipeline system 111. Monitoring system 131 is representative of one or more computing devices configured to monitor the operation of data pipeline system 111. Monitoring system 131 is configured to ingest pipeline outputs 114 from data pipeline 112. In some examples, monitoring system 131 may possess a communication link with data target 121 and receive pipeline outputs 114 indirectly via data target 121. Monitoring system 131 comprises computing device 132, user interface 133, and pipeline control module 134. Computing device 132 comprises one or more computing apparatuses configured to host pipeline control module 134 and present a Guided User Interface (GUI) on user interface 133. Pipeline control module 134 is representative of one or more applications configured to monitor the operation of data pipeline system 111. It should be appreciated that the specific number of applications and modules hosted by computing device 132 is not limited. Exemplary applications hosted by computing device 132 to monitor the operations of data pipeline system 111 include Data Culpa Validator and the like. Computing device 132 is coupled to user interface 133. User interface 133 comprises a display, keyboard, touchscreen, tablet, and/or other elements configured to provide a visual representation of, and means to interact with, pipeline control module 134. For example, user interface 133 may receive keyboard inputs, touchscreen inputs, and the like to facilitate interaction between a user and pipeline control module 134. User interface 133 provides a GUI display that allows a user to interact with pipeline control module 134 and/or any other application(s) hosted by computing device 102 to monitor the operation of data pipeline system 111.

Pipeline control module 134 comprises visual elements to sample and score pipeline outputs generated by data pipeline system 111. The visual elements include pipeline output 135, output sample 136, set score 137, and confidence score 138. Pipeline output 135 comprises a data set generated by data pipeline 112. Output sample 136 comprises a subset of pipeline output 135. Pipeline control module 134 may select data values from pipeline output 135 based on an amount of available computing resources of cloud computing services 141. Monitoring system 131 often utilizes cloud computing services 141 to perform data processing operations on pipeline outputs generated by data pipeline 112. However, only a portion of the computing resources of cloud computing services 141 are available at any given time. The amount of values sampled from pipeline output 135 to generate output sample 136 increases when the amount of available computing resources increase. Set score 137 comprises a quality rating for pipeline output 135 based on one or more quality attributes of output sample 136. For example, pipeline control module 134 may compare output sample 136 to an implicitly defined data standard that indicates a preferred format for pipeline outputs 114. Pipeline control module 134 may generate set score 137 based on the similarity between output sample 136 and the implicitly defined data standard. Confidence score 138 comprises an accuracy rating for set score 137. Since output sample 136 comprises a subset of pipeline output 135, set score 137 may not be fully accurate. Pipeline control module 134 generates confidence score 138 based on the proportion of pipeline output 135 that output sample 136 comprises. Typically, confidence score 138 increases as the proportion of pipeline output 135 that output sample 136 comprises increases.

Cloud computing service 141 is representative of a computing suite utilized by monitoring system 131 to perform computationally intensive processing operations. Cloud computing service 141 is operatively coupled with computing device 132. For example, cloud computing services 141 may receive data sets ingested by computing device 132, process the data sets to identify schemas, data types, data value ranges, and/or other data attributes to characterize data sets ingested by monitoring system 131. Cloud computing service 141 returns the processing results to computing device 132 in monitoring system 131.

Data pipeline system 111, data target 121, monitoring system 131, cloud computing services 141 comprise microprocessors, software, memories, transceivers, bus circuitry, and the like. The microprocessors comprise Central Processing Units (CPUs), Graphical Processing Units (GPUs), Application-Specific Integrated Circuits (ASICs), Field Programmable Gate Arrays (FPGAs), and/or other types of processing circuitry. The memories comprise Random Access Memory (RAM), flash circuitry, disk drives, and/or the like. The memories store software like operating systems, user applications, data analysis applications, and data processing functions. The microprocessors retrieve the software from the memories and execute the software to drive the operation of the data processing system as described herein. The communication links that connect the elements of data processing system use metallic links, glass fibers, radio channels, or some other communication media. The communication links use Time Division Multiplex (TDM), Data Over Cable System Interface Specification (DOCSIS), Internet Protocol (IP), General Packet Radio Service Transfer Protocol (GTP), Institute of Electrical and Electron Engineers (IEEE) 802.11 (WIFI), IEEE 802.3 (ENET), virtual switching, inter-processor communication, bus interfaces, and/or some other data communication protocols. Data pipeline system 111, data target 121, monitoring system 131, and cloud computing services 141 may exist as a single computing device or may be distributed between multiple computing devices.

Figure 2:
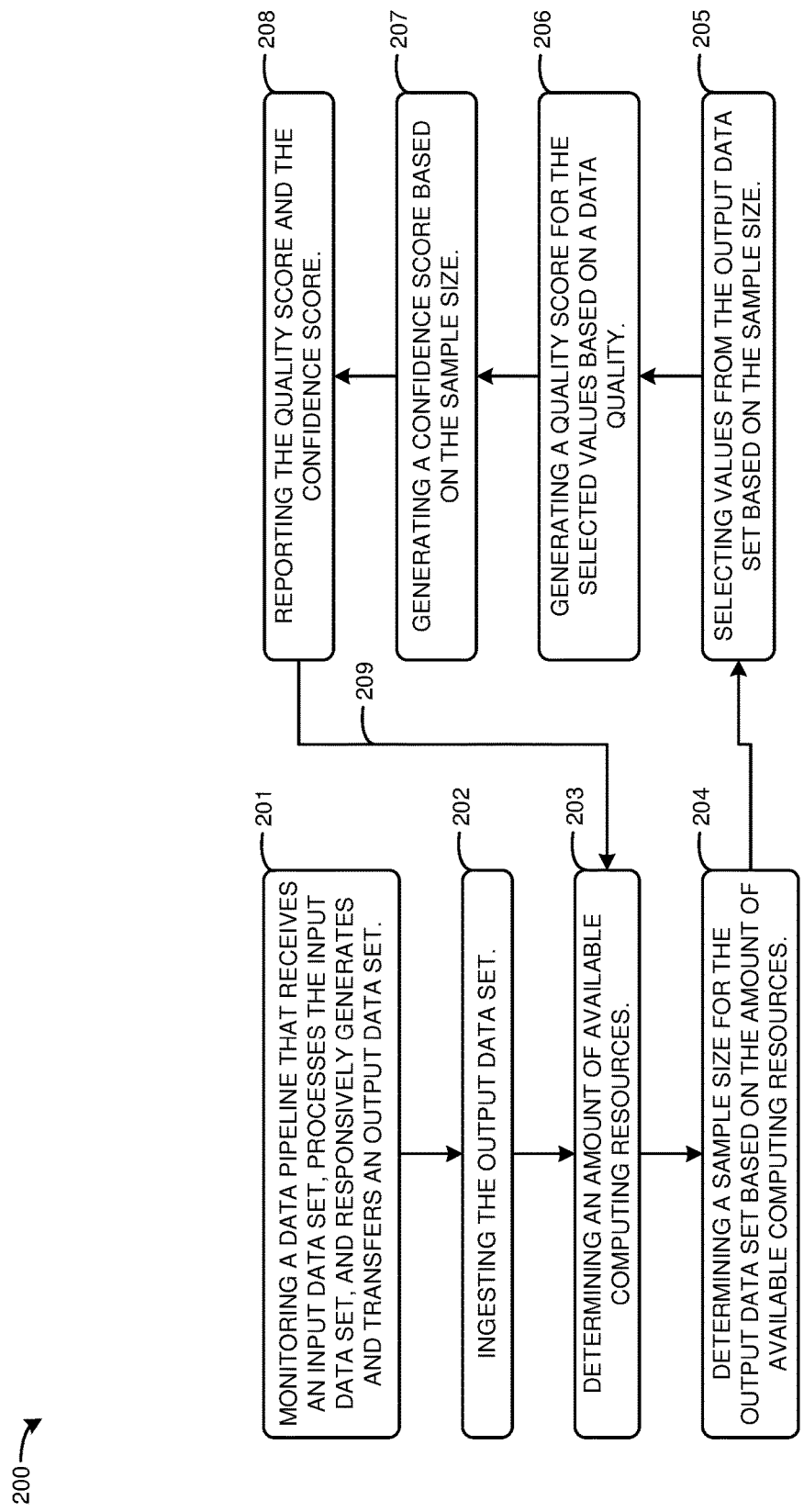
FIG. 2 illustrates an exemplary operation to sample pipeline outputs.

In some examples, data processing environment 100 implements process 200 illustrated in FIG. 2. It should be appreciated that the structure and operation of data processing environment 100 may differ in other examples.

FIG. 2 illustrates process 200. Process 200 comprises a process to sample data outputs generated by a data pipeline. Process 200 may be implemented in program instructions in the context of any of the software applications, module components, or other such elements of one or more computing devices. The program instructions direct the computing devices(s) to operate as follows, referred to in the singular for the sake of clarity.

The operations of process 200 include monitoring the operations of a data pipeline that receives data inputs, processes the data inputs, and responsively generates and transfers a data output (step 201). The operations continue with ingesting the output data set (step 202). The operations continue with determining an amount of available computing resources (step 203). The operations continue with determining a sample size for the output data set based on the amount of available computing resources (step 204). The operations continue with selecting values form the output data set based on the sample size (step 205). The operations continue with generating a quality score for the selected values based on a data quality (step 206). The operations continue with generating a confidence score based on the sample size (step 207). The operations continue with reporting the quality score and the confidence score (step 208). In some examples, the operations continue with returning to process step 203 and repeating process 200 from step 203 recursively (step 209).

Referring back to FIG. 1, data processing environment 100 includes a brief example of process 200 as employed by one or more applications hosted by computing device 132, data target 121, and cloud computing services 141. The operation may differ in other examples.

In operation, monitoring system 131 monitors the operation of the data pipeline (step 201). For example, computing device 132 may be operatively coupled to data pipeline 112. Data pipeline 112 receives pipeline inputs 113 from the data source 101. Data pipeline 112 executes a transform function on pipeline inputs 113 and responsively generates pipeline outputs 114. Pipeline outputs 114 comprises strings, integers, and/or another type of data. In some examples, the data sets that comprises pipeline outputs 114 may comprise up to one-billion individual data values. Data pipeline 112 transfers pipeline outputs to data target 121 and to computing device 132.

Computing device 132 ingests output data set 135 generated by data pipeline 112 (step 202). Pipeline control module 134 receives a data quality request for output data set 135 from a pipeline operator. For example, the data quality request may comprise a request to identify data consistency, data type, data structure, and/or some other type of data quality for output data set 135 ingested by computing device 132. In some examples, pipeline control module 134 receives the data quality request via user interface 133. Pipeline control module 134 determines the amount of available computing resources in cloud computing services 141 (step 203). For example, pipeline control module 134 may query cloud computing services 141 for percent occupancy to determine the amount of available computing resources. Typically, only a fraction of the computing resources possessed by cloud computing services 141 are available to the pipeline control module 134 at any given time. Pipeline control module 134 determines a sample size for output data set 135 based on the amount of available computing resources (step 204). Pipeline control module 134 selects a portion of the values that comprise output data set 135 based on the sample size (step 205). Pipeline control module 134 may select the individual values randomly, periodically, by section, and/or by some other method. Pipeline control module 134 selects a greater number of the values when a large amount of computing resources are available and selects a fewer number of the values when a small amount of the computing resources are available. The selected values of pipeline output 135 form output sample 136. Pipeline control module 134 utilizes the available computing resources of cloud computing services 141 to score output sample 136 (step 206). For example, pipeline control module 134 may compare output sample 136 to historical output values and responsively estimate data consistency for pipeline output 135. For example, pipeline control module 134 may identify the number of null fields in output sample 136 to determine data quality. Pipeline control module 134 generates set score 137 for pipeline output 135 based on the score of output sample 136. Pipeline control module 134 generates confidence score 138 for the set score 137 based on the amount of the sample size of output sample 136 (step 207). For example, the selected values may comprise 5% of pipeline output 135 and pipeline control module 134 may responsively generate confidence score 138 based on the percentage. Typically, confidence score 138 increases with an increase in the sample size of output sample 136 and decreases with a decrease in the sample size. Pipeline control module 134 reports set score 137 and confidence score 138 to downstream systems (step 208). The reporting procedure may include displaying the scores on user interface 133, transferring the score to pipeline system 111, and/or transferring the score for display on user interface systems of data target 121.

Subsequently, pipeline control module 134 determines that additional computing resources are available from cloud computing services 141 (step 209). For example, cloud computing services 141 may activate additional servers to increase the amount of available computing resources and may notify pipeline control module 134. Pipeline control module 134 updates the sample size for output sample 136 based on the increased availability of the computing resources and selects additional values from pipeline output 135 based on the updated sample size. Pipeline control module 134 scores the initially selected values of output sample 136 and the additionally selected values. Pipeline control module 134 updates set score 137 for pipeline output 135 based on the score for the initially selected values and the additionally selected values. Pipeline control module 134 updates confidence score 138 for the now updated set score 137 based on updated sample size of output sample 136. For example, the amount of the selected values and the amount of the selected additional values may comprise 20% of the values of pipeline output 135 and pipeline control module 134 may update confidence score 138 to be higher than its initial value. Pipeline control module 134 reports the updated quality score and the updated confidence score to downstream systems. Conversely, confidence score 138 decreases, pipeline control module 134 repeats the process to increase the sample size so that the sampled data is more representative of the output data set.

Advantageously, the monitoring system 131 efficiently utilizes available computing resources to process data sets generated by a data pipeline. Moreover, monitoring system 131 effectively samples data sets for analysis based on the amount of available computing resources.

Figure 3:
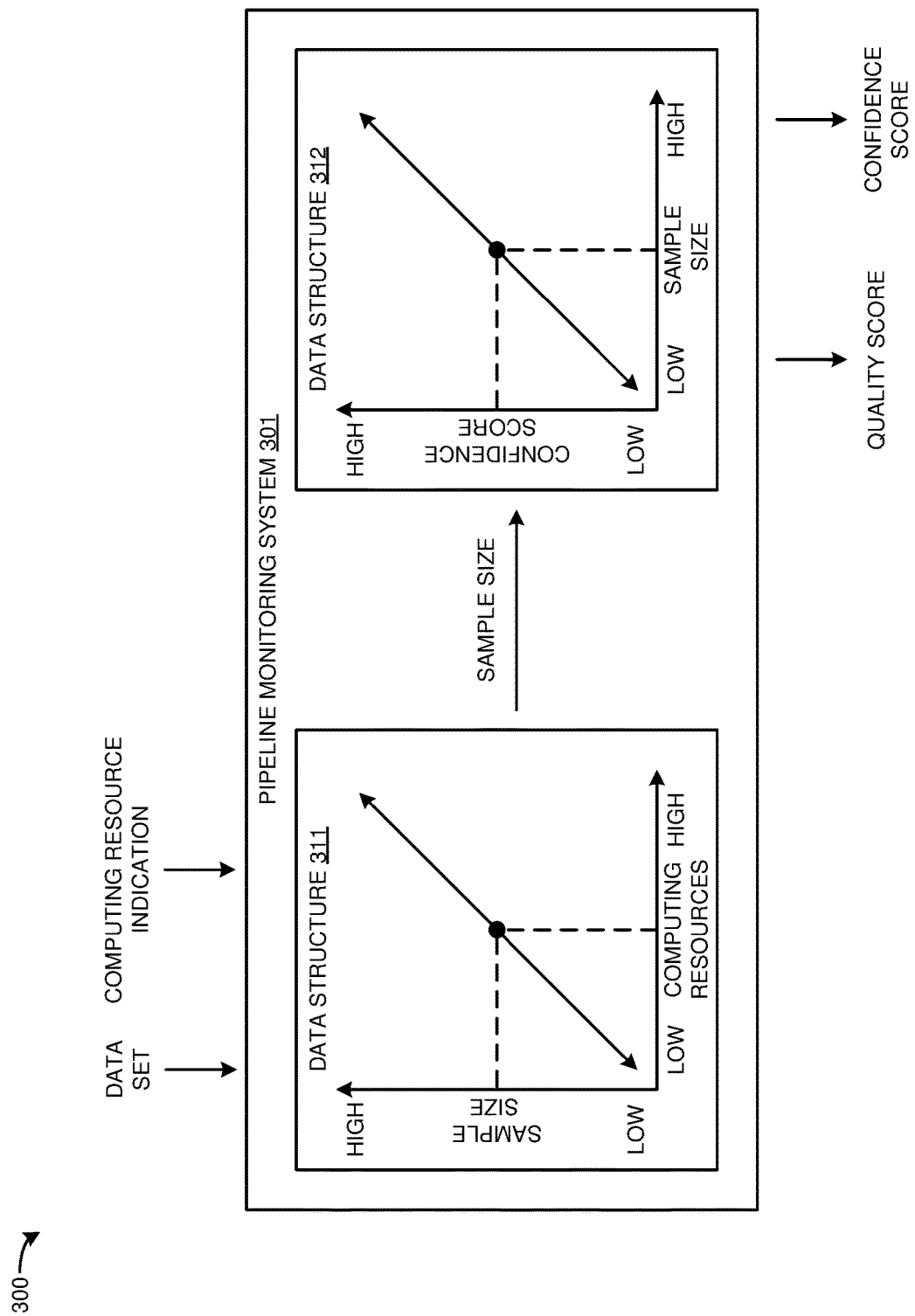
FIG. 3 illustrates an exemplary data processing environment to sample pipeline outputs.

FIG. 3 illustrates data processing environment 300. Data processing environment 300 is an example of data processing environment 100, however environment 100 may differ. Data processing environment 300 comprises pipeline monitoring system 301. Pipeline monitoring system 301 is representative of one or more computing devices configured to ingest data sets generated by a data pipeline and score the data sets to determine one or more quality attributes of the data. Pipeline monitoring system 301 hosts data structures 311 and 312.

In some examples, pipeline monitoring system 301 ingests a data set. The data set may be received from a data target (e.g., a data lake) of the data pipeline or directly from the data pipeline. Pipeline monitoring system 301 utilizes cloud computing resources to provide computing power to analyze the data set. Monitoring system 301 queries a cloud computing system to determine an amount of available computing resources in the cloud. For example, monitoring system 301 may query the cloud computing system to determine average processor load, memory percent occupancy, queue times, and/or other metrics that quantify the available computing power in the cloud. Alternatively, monitoring system 301 may receive a cloud computing availability indication from the cloud without solicitation by monitoring system 301. For example, monitoring system 301 may receive indications of available computing resources in the cloud on a scheduled basis (e.g., one indication an hour).

Monitoring system 301 applies the computing resources indication received from the cloud to data structure 311 to determine a sample size for the ingested data set. Data structure 311 comprises a graph that correlates available computing resources to a sample size. The x-axis of data structure 311 comprises available computing resources input in an exemplary range of low to high. The y-axis of data structure 311 comprises sample size output in an exemplary range of low to high. As illustrated in FIG. 3, an amount of available computing resources in the cloud correlates to a sample size for the data set.

Pipeline monitoring system 301 samples the data set based on the sample size indication output by data structure 311. The sample size indication may comprise a percentage and pipeline monitoring system 301 may sample the indicated percentage of data values of the data set. For example, monitoring system 301 may sample 5% of the data set. Alternatively, the sample size indication may comprise a numeric value and pipeline monitoring system 301 may sample the numeric value of the data values of the data set. For example, the numeric value may comprise 5,000 and monitoring system 301 may sample 5,000 data values of the data set. Pipeline monitoring system 301 utilizes the available computing resources of the cloud to analyze the sampled portion of the data set and generate a quality score for the data set. The analysis may determine historical consistency, differences between expected and actual values, differences between preferred and actual data attributes, and the like. For example, pipeline monitoring system 301 may process the sample to determine data schemas, data types, and data value ranges for the sample and compare the data schemas, data types, and data value ranges for the sample to a data standard that indicates preferred data schemas, data types, and data value ranges. Pipeline monitoring system 301 may then generate a quality score for the data set based on the similarity between the data schemas, data types, and data value ranges of the sample to the preferred data schemas, data types, and data value ranges indicated by the data standard. The quality score comprises a numeric value that indicates overall data quality for the data set. For example, the quality score may comprise an integer between 0 and 100 with a score of 100 indicating a high-quality data set and a score of 0 indicating a low-quality data set.

Monitoring system 301 applies the selected sample size indicated by data structure 311 to data structure 312. Data structure 312 comprises a graph that correlates selected sample size to a confidence score. The confidence score indicates a probability that the quality score for the data set is accurate. The x-axis of data structure 312 comprises a selected sample size input in an exemplary range of low to high. The y-axis of data structure 312 comprises a confidence score output an exemplary range of low to high. As illustrated in FIG. 3, a selected sample size correlates to a confidence score for the quality score of the data set. For example, the sample size input to data structure 312 may indicate that the selected sample size comprise 5% of the total data values of the data set. Data structure 312 may correlate the 5% proportion for the sample size to an 85% confidence score for the quality score. Monitoring system 301 outputs the quality score for the data set and the confidence score for the quality score. For example, monitoring system 301 may present the quality score and the confidence score on a GUI of a user computing device. Alternatively, monitoring system 301 may transfer an email and/or SMS message that indicates the quality score and the confidence score.

Figure 4:
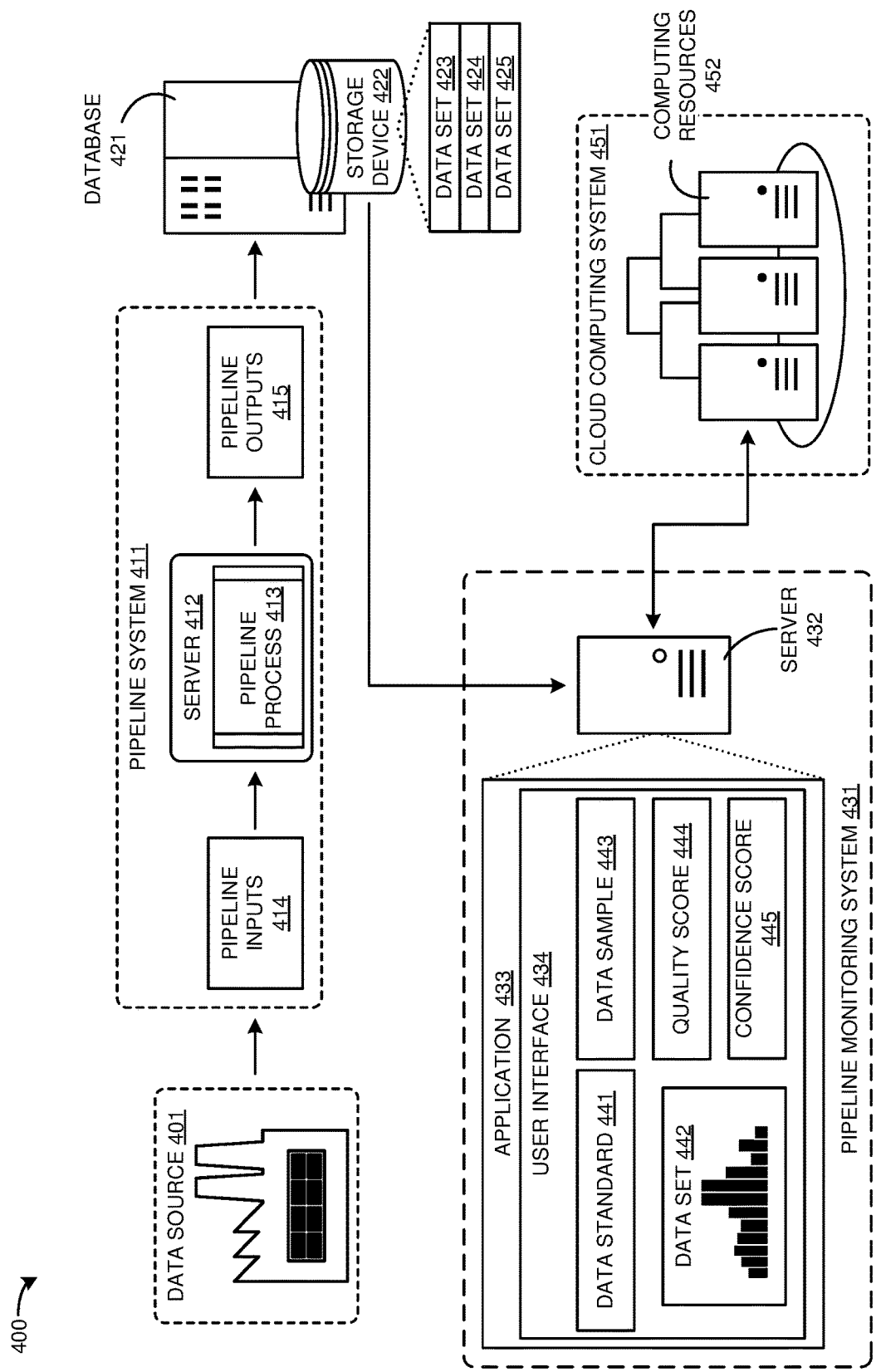
FIG. 4 illustrates an exemplary data processing environment to sample pipeline outputs.

FIG. 4 illustrates data processing environment 400 to sample data outputs generated by a data pipeline. Data processing environment 400 is an example of data processing environment 100, however data processing environment 100 may differ. Data processing environment 400 comprises data source 401, pipeline system 411, database 421, pipeline monitoring system 431, and cloud computing system 451. Pipeline system 411 comprises server 412, pipeline process 413, pipeline inputs 414, and pipeline outputs 415. Database 421 comprises storage device 422 and data sets 423-425. Pipeline monitoring system 431 comprises server 432, application 433, user interface 434, data standard 441, data set 442, data sample 443, quality score 444, and confidence score 445. Cloud computing system 451 comprises computing resources 452. In other examples, data processing environment 400 may include fewer or additional components than those illustrated in FIG. 4. Likewise, the illustrated components of data processing environment 400 may include fewer or additional components, assets, or connections than shown. Each of data source 401, pipeline system 411, database 421, pipeline monitoring system 431, and/or cloud computing system 451 may be representative of a single computing apparatus or multiple computing apparatuses.

Data source 401 is representative of one or more computing devices configured to generate input data configured for ingestion by data pipeline system 411. In this example, data source 401 comprises a manufacturing environment that generates input data that characterizes manufacturing operations. For example, the input data may characterize production data like units produced per day. In other examples, data source 401 may produce a different type of data like financial data, scientific data, machine learning data, medical records, and/or other types of input data for consumption by data pipeline system 411. Typically, the input data generated by data source 401 comprise a form not-suitable for end user consumption (e.g., storage in database 421) and requires data processing by data pipeline system 411. It should be appreciated that the types of data sources that comprise data source 401 and the input data generated by data source 401 are not limited.

Pipeline system 411 is representative of a data processing system configured to receive and process input data from data source 401. Pipeline system 411 is an example of data pipeline system 111, however system 111 may differ. Pipeline system 411 comprises server 412, pipeline process 413, pipeline inputs 414, and pipeline outputs 415. Server computer 412 comprises processors, bus circuitry, storage devices, software, and the like configured to host pipeline process 413. The processors may comprise CPUs, GPUs, ASICs, FPGAs, and the like. The storage devices comprise flash circuitry, RAM, HDDs, SSDs, NVMe SSDs, and the like. The storage devices store the software. The processors may retrieve and execute software stored on the storage devices to drive the operation of pipeline process 413. Pipeline process 413 comprises a series of processing algorithms configured to transform pipeline inputs 414 into pipeline outputs 415. The data processing algorithms may comprise one or more transform functions configured to operate on pipeline inputs 414. The transform functions may be executed by the processors of server 412 on pipeline inputs 414 and responsively generate pipeline outputs 415. Pipeline inputs 414 comprise data generated by data source 401. Pipeline outputs 415 comprise data emitted by pipeline process 413. For example, pipeline process 413 may comprise a data cleaning process that transforms pipeline inputs 414 into pipeline outputs 415 suitable for storage in database 421. The cleaning process may comprise reformatting, redundancy removal, or some other type of operation to standardize pipeline inputs 414. It should be appreciated that pipeline process 413 is exemplary and the specific data processing operations implemented by pipeline process 413 are not limited.

In some examples, pipeline process 413 may comprise a machine learning model where pipeline inputs 414 represent machine learning inputs and pipeline outputs 415 represent machine learning outputs. The machine learning model may comprise one or more machine learning algorithms trained to implement a desired process. Some examples of machine learning algorithms include artificial neural networks, nearest neighbor methods, ensemble random forests, support vector machines, naïve Bayes methods, linear regressions, or other types of machine learning algorithms that predict output data based on input data. For example, pipeline inputs 414 may comprise feature vectors configured for ingestion by the one or more machine learning algorithms and pipeline outputs 415 may comprise machine learning decisions.

Database 421 comprises storage device 422 and is representative of a data target for pipeline process 413. Database 421 is an example of data target 121, however data target 121 may differ. Database 421 comprises processors, bus circuitry, storage devices (including storage device 422), software, and the like configured to store output data sets 423-425. The processors may comprise CPUs, GPUs, ASICs, and the like. The storage devices comprise flash drives, RAM, HDDs, SSDs, NVMe SSDs, and the like. The processors may retrieve and execute software stored upon the storage devices to drive the operation of database 421. Storage device 422 is configured to receive and store pipeline outputs 415 generated from pipeline process 413 as data sets 423-425. For example, storage device 422 may comprise an array of disk drives configured to store large amounts of data produced by pipeline system 411. Storage device 422 may implement a data structure that categorizes and organizes pipeline outputs 415 according to a data storage scheme. For example, output data sets 423-425 may be organized by data type, size, point of origin, and/or any other suitable data storage scheme. Database 421 may comprise user interface systems like displays, keyboards, touchscreens, and the like. The user interface systems may allow a human operator to review, select, and transfer ones of data sets 423-425 to pipeline monitoring system 431. Storage device 422 may transfer data sets 423-425 to determine data quality for sets 423-425 in response to user input received via the user interface devices of database 421.

Pipeline monitoring system 431 is representative of one or more computing devices integrated into a network configured to monitor the operation of data pipeline system 411. Pipeline monitoring system 431 is an example of monitoring system 131 and monitoring system 301, however monitoring systems 131 and 301 may differ. Pipeline monitoring system 431 comprises server computer 432. Server computer 432 comprises one or more computing devices configured to host application 433. Server 432 is communicatively coupled to database 421 to receive data sets 423-425 and coupled to cloud computing system 451 to receive additional computing resources. The one or more computing devices that comprise server 432 comprise processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of application 433. Server 432 is coupled to user interface 434. User interface 434 may include computers, displays, mobile devices, touchscreen devices, or some other type of computing device capable of performing the user interface functions described herein. A user may interact with application 433 via user interface 434 to generate, view, and interact with data standard 441, data set 442, data sample 443, quality score 444, and confidence score 445.

Application 433 is representative of one or more pipeline monitoring applications user interface applications, operating systems, modules, and the like. Application 433 is an example of pipeline control module 134, however pipeline control module 134 may differ. Application 433 is configured to receive data sets 423-425 generated by data pipeline system 411, sample data sets 423-425, and score data sets 423-425 for quality.

User interface 434 provides a graphical representation of application 433. The graphical representation comprises a GUI. The graphical representation on user interface 434 includes data standard 441, data set 442, data sample 443, and quality score 444. In other examples, the graphical representation may include additional or different types of visual indicators relevant to the operation and status of data pipeline system 411. Data standard 441 comprises an implicitly defined data standard that defines a preferred format for pipeline outputs 415. The preferred data formats may comprise metadata, data schemas, data value ranges, data types, and the like. For example, data standards 441 may indicate the preferred data value range as 0 to 100.

Data set 442 comprises a data set ingested by server 432. For example, data base 421 may transfer one of data sets 423-425 to server 432 and server 432 may ingest the received data set as data set 442. Data sample 443 comprises a subset of data standard 442. The sample size of data sample 443 depends in part on the amount of available computing resources in cloud computing system 451 and a processing urgency for data set 442. For example, a pipeline operator may indicate analysis results for data set 442 are needed quickly and application 433 may receive this indication as the processing urgency. Typically, the sample size of data sample 443 increases with an increase in available computing resources and increases with a decrease in processing urgency for data set 442. Application 433 selects constituent values of data set 442 to form data sample 443. Application 433 may select the values randomly, semi-randomly, or according to a selection format (e.g., selecting the first 5000 values).

Quality score 444 comprises a rating for one or more attributes of data set 442. For example, application 433 may compare data sample 443 with data standard 441 and generate quality score 444 for data set 442 based on the similarity between data sample 443 and data standard 441. Confidence score 445 comprises a confidence metric for quality score 444 that indicates how accurate quality score 444 is. The confidence metric may comprise a percent value between 0 and 100 where 100% indicates a high degree of confidence quality score 444 is accurate while 0% indicates a low degree of confidence quality score 444 is accurate. Typically, confidence score 445 increases as the sample size of data samples 443 increases.

Cloud computing system 451 is representative of one or more computing devices integrated into a network that communicates with pipeline monitoring system 431 to provide computational power to pipeline monitoring system 431. Examples of cloud computing system 451 may include server computers and data storage devices deployed on-premises, in the cloud, in a hybrid cloud, or elsewhere, by service providers such as enterprises, organizations, individuals, and the like. Cloud computing system 451 may rely on the physical connections provided by one or more other network providers such as transit network providers, Internet backbone providers, and the like to communicate with pipeline monitoring system 431. Cloud computing system 451 comprises computing resources 452. The one or more computing devices that comprise computing resources 452 comprise processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of cloud computing system 451. Cloud computing system 451 is operatively coupled to monitoring system 431. Cloud computing system 451 receives data processing requests to analyze data sets ingested by monitoring system 431 and returns analysis results to monitoring system 331. For example, cloud computing system 451 may apply data standard 441 to data sample 443 and return the comparison results to monitoring system 431. Cloud computing system 451 may indicate an availability of computing resources 452 to monitoring system 431 in response to solicitation by monitoring system 431.

Figure 5:
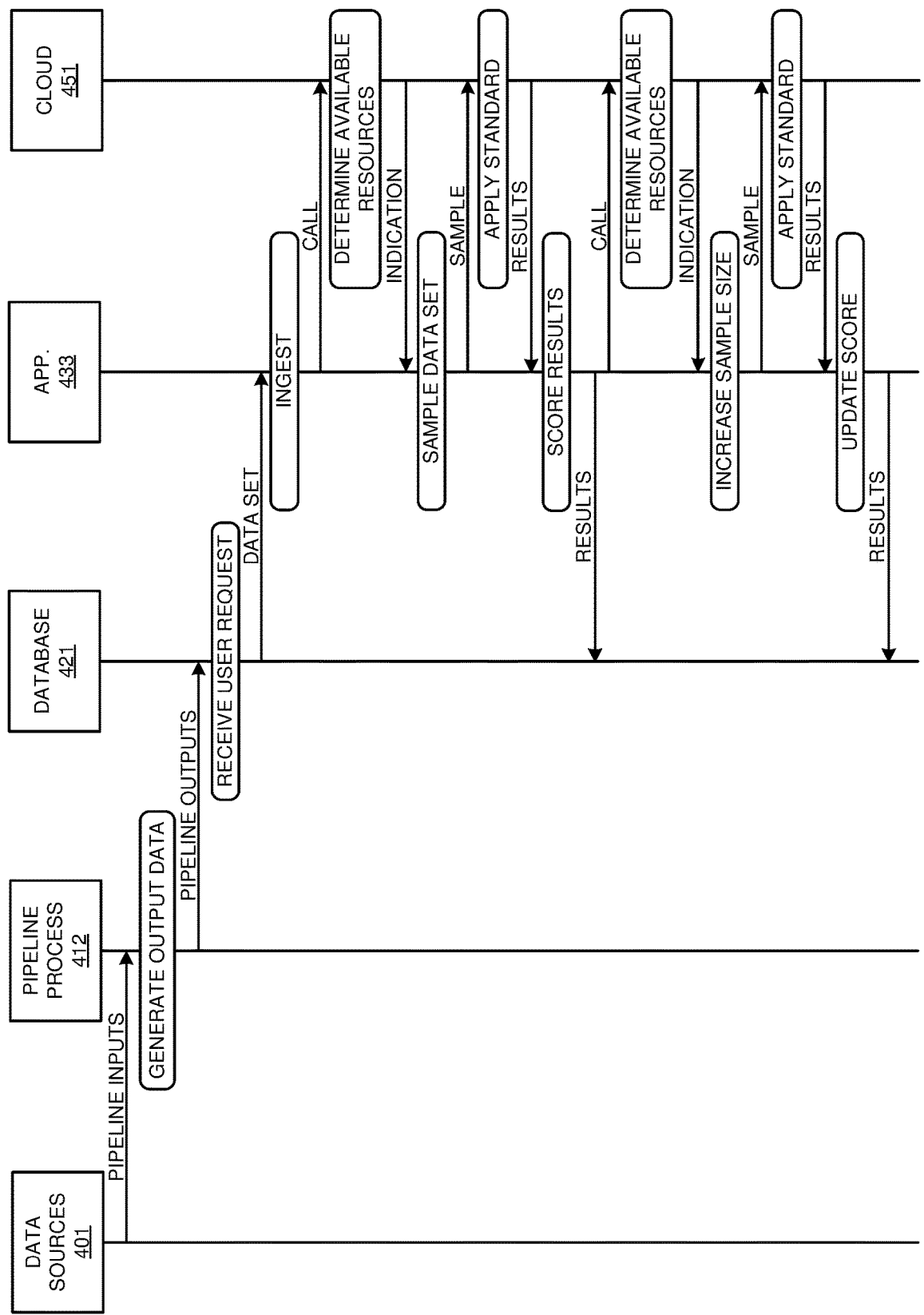
FIG. 5 illustrates an exemplary operation to sample pipeline outputs.

FIG. 5 illustrates an exemplary operation of data processing environment 400 to sample output data sets generated by a data pipeline. The operation depicted by FIG. 5 comprises an example of process 200 illustrated in FIG. 2 however process 200 may differ. In other examples, the structure and operation of data processing environment 400 may be different.

In operation, data source 401 transfers unprocessed data to data pipeline 411. For example, data source 401 may generate machine operation data like average temperature in the manufacturing environment and transfer the machine operation data to data pipeline system 411. Data pipeline system 411 receives the unprocessed data as pipeline inputs 414. Server 412 ingests pipeline inputs 414 and implements pipeline process 413. Pipeline process 413 cleans, transforms, applies a schema, or otherwise processes pipeline inputs 414 into a consumable form to generate pipeline outputs 415. Server 412 transfers pipeline outputs 415 to database 421. Database 421 receives pipeline outputs 415 as output data and stores the output data in storage device 422 as data sets 423-425. Database 421 receives a user request to analyze one of sets 423-435. The user request indicates a processing urgency for the selected on of sets 423-425. The processing urgency indicates how quickly the analysis needs to be performed. In response to the user request, database 421 calls application 433 hosted by server computer 432 to ingest one or more of data sets 423-425 generated by data pipeline system 411 for analysis. For example, application 433 may possess an Application Programming Interface (API) to receive data ingestion requests. The call additionally indicates the user defined processing urgency.

Application 433 accepts the call from database 421 and ingests the received data set. Application 433 calls cloud computing system 451 to determine the availability of computing resources 451. For example, application 433 may drive transceiver circuitry to call an API of cloud computing system 451 to determine the availability of computing resources 451. Cloud computing system 451 receives the call and determines average processor load, average memory occupancy, and average queue times for computing resources 451. Cloud computing system 451 indicates the average processor load average, memory occupancy, and average queue times for computing resources 452 to application 433. Application 433 selects a sample size for data sample 443 based on the average processor load, the average memory occupancy, the average queue times for computing resources 452, and the user defined processing urgency. Application 433 may calculate a weighted sum that takes correlates the average processor load, the average memory occupancy, the average queue times for computing resources 452, and the user defined processing urgency and outputs a samples size. For example, the weighted sum may take the following form:

$$\text{sample size} = \Sigma(a \times \text{load}) + (b \times \text{occupancy}) + (c \times \text{queue}) + (d \times \text{urgency})$$

where a, b, c, and d represent the variable weights for the load, occupancy, queue time, and urgency. The sample size increases as processor load decreases, memory occupancy decreases, queue times decrease, and user urgency decreases. It should be appreciated that the weighted sum equation is exemplary and may differ in other examples.

Upon determining the sample size, application 433 samples data set 442 based on the determined sample size to generate data sample 443. Application 433 may uniformly select values from data set 442. For example, data set 442 may comprise 10,000 values and the calculated sample size may comprise 1,000 values and application 433 may select every tenth value in data set 442 to uniformly select the values to generate data sample 443. By uniformly selecting the values, application 433 may increase the value diversity of data sample 443 to better reflect data set 442. Application 433 transfers data standard 441 and data sample 443 to cloud computing system 451. Cloud computing system 451 receives data standard 441 and data sample 443 and computing resources 452 apply data standard 441 to data sample 443. Typically, the processing time for data sample 443 decreases as the sample size of data sample 443 decreases. Computing resources 452 may determine a statistical distance between data standard 441 to data sample 443 to determine how similar data sample 443 is to data standard 441. The distance may comprise a geometric distance, a Hamming distance, Jaccard distance, or some other type of statistical metric to quantify a mathematic difference between histograms. Cloud computing system 451 returns the comparison results to application 433. The comparison results indicate how similar data sample 443 is to data standard 441. For example, the comparison results may indicate the proportion of data strings of data sample 443 differs from a preferred string proportion defined by data standard 441.

Application 433 generates quality score 444 based on the comparison results received from cloud computing system 451. Quality score 444 indicates the degree of similarity between data set 442 and data standard 441. Quality score 444 may comprise a number, percentage, letter grade, and/or some other type of quality indication. Quality score 444 increases when the similarity between data sample 443 and data standard 441 increases and decreases when the similarity between data sample 443 and data standard 441 decreases. For example, application 433 may score the similarity between data sample 443 and data standard 441 as 85/100 to generate quality score 444.

Application 433 determines the ratio between the size of data set 442 and data sample 443. Application 433 may divide the number of values that comprise data sample 443 by the number of values that comprise data set 442 to determine the ratio. For example, application 433 may determine data sample 443 comprises 5% of the values of data set 442. Application 433 generates confidence score 445 for quality score 444 based on the ratio between the size of data set 442 and data sample 443. Confidence score 445 comprises a percent value like a confidence interval that indicates the probability that quality score 444 is accurate. As the proportion of values comprised by data sample 443 increases, confidence score 445 increases. Application 433 may implement a data structure that correlates value proportion to a confidence score. For example, application 433 may determine data sample 443 comprises 20% of the values of data set 442 and input the 20% proportion to the data structure and determine a confidence metric of 95%. Application 433 transfers quality score 444 and confidence score 445 to database 421 to notify the database operators.

Subsequently, cloud computing system 451 increases the amount of available computing resources for computing resources 452. For example, cloud computing system 451 may spin up additional server computers in response to an increase in demand. Application 433 calls cloud computing system 451 to determine if the availability of computing resources 452 has increased. Cloud computing system 451 receives the call and redetermines average processor load, average memory occupancy, and average queue times for computing resources 452. Cloud computing system 451 indicates the average processor load average, memory occupancy, and average queue times for computing resources 452 to application 433. Application 433 increases the sample size for data sample 443 based on the increase in availability of computing resources 452. In other examples, the availability of computing resources 452 may decrease. In such cases, application 433 may set a timer to recheck the availability of computing resources 452 to determine when availability increases.

Upon increasing the sample size, application 433 resamples data set 442 based on the increased sample size to update data sample 443. Application 433 transfers data standard 441 and data sample 443 to cloud computing system 451. Cloud computing system 451 receives data standard 441 and data sample 443. Computing resources 452 apply data standard 441 to data sample 443. Cloud computing system 451 returns the comparison results to application 433.

Application 433 updates quality score 444 based on the comparison results received from cloud computing system 451. Application 433 redetermines the ratio between the size of data set 442 and data sample 443. Application 433 updates confidence score 445 for quality score 444 based on the new ratio between the size of data set 442 and data sample 443. By increasing the sample size of data sample 443, application 433 may increase the accuracy of quality score 444 for data set 442. Application 433 transfers updated quality score 444 and updated confidence score 445 to database 421 to notify the database operators.

Figure 6:
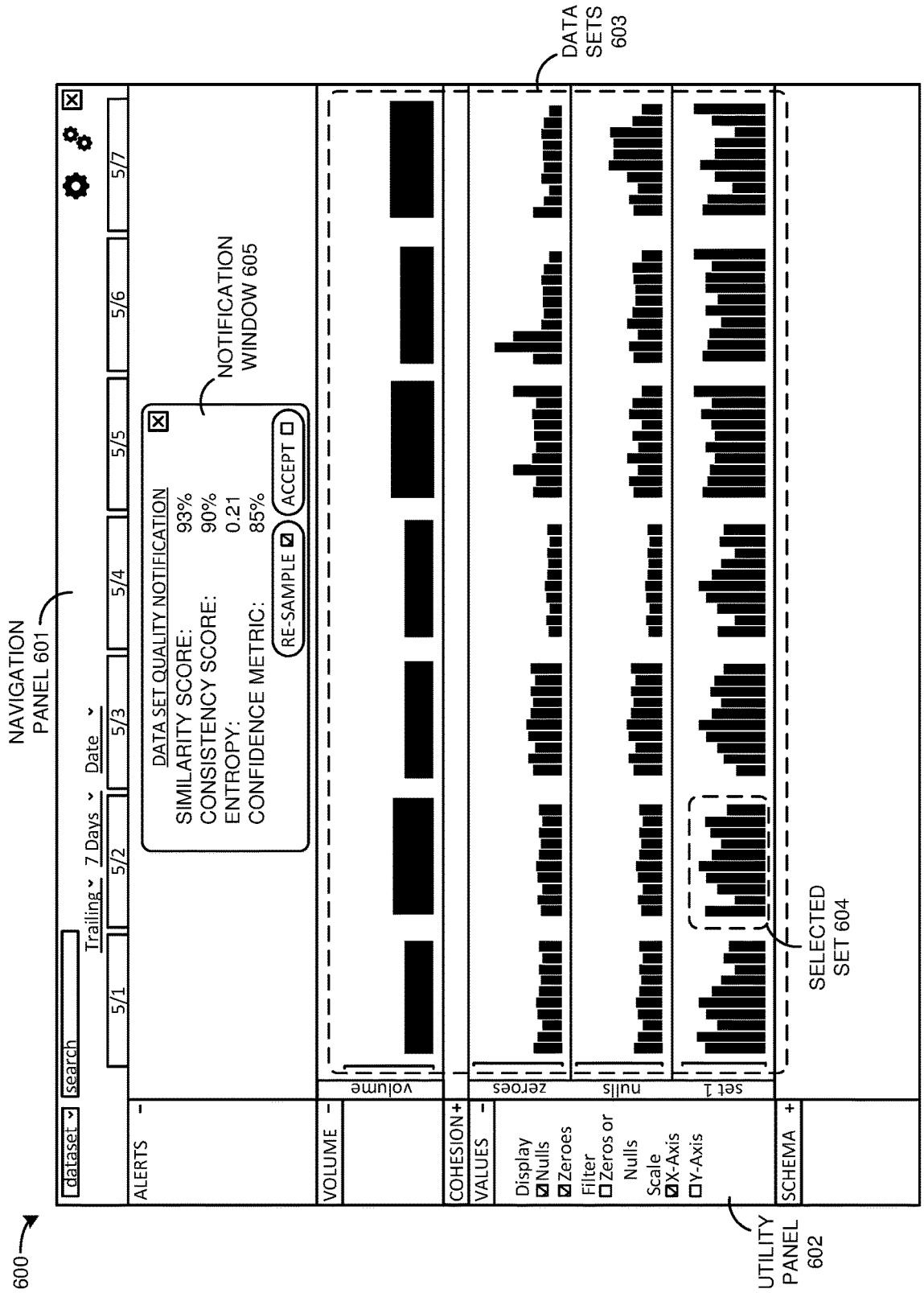
FIG. 6 illustrates an exemplary user interface to sample pipeline outputs.

FIG. 6 illustrates user interface 600 to sample output data sets generated by a data pipeline. User interface 600 comprises an example of user interface 133 and user interface 434, however user interface 133 and user interface 434 may differ. User interface 600 comprises a pipeline monitoring application presented on a display screen which is representative of any user interface for sampling data sets associated with a data pipeline. User interface 600 comprises a GUI configured to allow a user to view operational metrics for a data pipeline like data volume and data shape and to receive notifications regarding quality scores for selected data sets. The GUI provides visualizations for how data set volume, data set values, data set zero values, and data set null values change over time. In other examples, the GUI of user interface 600 may differ.

User interface 600 includes navigation panel 601. Navigation panel 601 comprises tabs like "dataset" and "search" that allows a user to find and import data sets into user interface 600. For example, a user may interact with the "dataset" tab to import a data set from a data storage system that receives the outputs of the pipeline. Navigation panel 601 also includes date range options to select data sets a data set from a period of time. In this example, a user has selected to view a data set over a week ranging from May $1^{st}$ to May $7^{th}$ labeled as 5/1-5/7 in user interface 600. In other examples, a user may select a different date range and/or a different number of days.

User interface 600 includes utility panel 602. Utility panel 602 comprises tabs labeled "ALERTS", "VOLUME", "COHESION", "VALUES", and "SCHEMA". In other examples, utility panel 602 may comprise different tabs than illustrated in FIG. 6. When a user selects one of the tabs, the tab expands to reveal its contents. In this example, a user has opened the "VALUES" tab, the "VOLUME" tab, and the "ALERTS" tab. The "VALUES" tab and the "VOLUME" tab comprises data sets 603. The "VALUES" tab also includes display options to modify the view of data sets 603. The display options include toggles labeled "Nulls", "Zeroes", "Zeroes or Nulls", "X-Axis", and "Y-Axis". In other examples, the display options may differ. The "ALERTS" tab comprises notification window 605.

User interface 600 includes data sets 603. Data sets 603 comprises histogram visualizations of data sets imported into user interface 600. In this example, data sets 603 include "volume", "zeroes", "nulls", and "set 1". Each set of data sets 603 corresponds to the date selected by a user in navigation panel 601. For example, the "zeroes" data set of data sets 603 is presented as a row with each portion of the set corresponding to the dates presented in navigation panel 601. Data sets 603 allow a user to view the shape and/or other attributes of the imported data sets. The "zeroes" sets of data sets 603 comprise histograms that characterize the number of zero values for the data fields that comprise outputs of a data pipeline. The "nulls" sets of data sets 603 comprise histograms that characterize the number of null fields for the data sets that comprise outputs of a data pipeline. The "volume" sets of data sets 603 indicates the data volume output by the data pipeline. The "set 1" sets of data sets 603 comprise histograms that characterize the value distributions for the data fields that comprise outputs of a data pipeline. Data sets 603 comprise selected set 604. Selected set 604 is representative of a user selection to drive the pipeline monitoring application of user interface 600 to analyze the selected data set. For example, a user input may choose selected set 604 and the pipeline monitoring application may interact with a cloud computing system to sample and apply a data standard to selected set 604. In other examples, data sets 603 may comprise different types of data sets than those illustrated in FIG. 6.

User interface 600 includes notification window 605. Notification window 605 comprises indicates data analysis results for selected set 604. Notification window 605 comprises a similarity score, a consistency score, an information entropy metric, and a confidence metric for selected set 604. The similarity score indicates the degree of similarity between selected set 604 and a data standard. The consistency score indicates the degree of similarity between selected set 604 and historical data sets. The information entropy metric indicates the level of randomness in the data values of selected set 604. For example, the pipeline monitoring application of user interface 600 may implement process 200 described in FIG. 2 to generate the similarity score, the consistency score, the information entropy metric, and the confidence metric for selected set 604 displayed in notification window 605. Notification window 605 comprises user selectable options to re-sample selected set 604 and to accept the analysis results for selected set 604. The user selectable options comprise options to accept the results and to resample selected set 604. In other examples, notification window 605 may comprise different user selectable options. In this example, a user has selected the option to resample selected set 604. For example, a user may be dissatisfied with the confidence metric in notification window 605 and wish to re-sample to selected set 604 to increase the accuracy of the similarity score and the consistency score. In should be appreciated that notification window 605 is exemplary and may differ in other examples.

Figure 7:
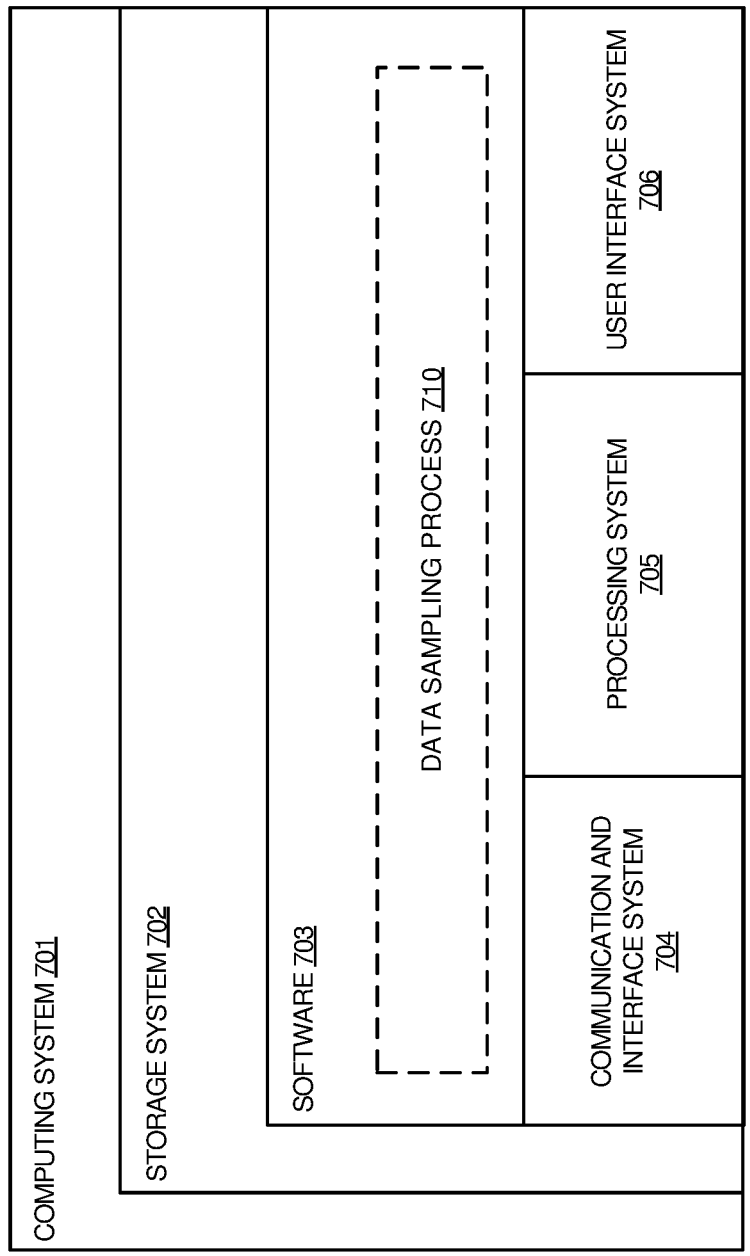
FIG. 7 illustrates an exemplary computing device that may be used in accordance with some embodiments of the present technology.

FIG. 7 illustrates computing device 701 which is representative of any system or collection of systems in which the various processes, programs, services, and scenarios disclosed herein for sampling outputs of a data pipeline within data processing environments may be implemented. For example, computing device 701 may be representative of data pipeline system 111, data target 121, computing device 132, user interface 133, cloud computing services 151, pipeline system 411, database 421, server 432, cloud computing system 451, and/or user interface 600. Examples of computing system 701 include, but are not limited to, server computers, routers, web servers, cloud computing platforms, and data center equipment, as well as any other type of physical or virtual server machine, physical or virtual router, container, and any variation or combination thereof.

Computing system 701 may be implemented as a single apparatus, system, or device or may be implemented in a distributed manner as multiple apparatuses, systems, or devices. Computing system 701 includes, but is not limited to, storage system 702, software 703, communication and interface system 704, processing system 705, and user interface system 706. Processing system 705 is operatively coupled with storage system 702, communication interface system 704, and user interface system 706.

Processing system 705 loads and executes software 703 from storage system 702. Software 703 includes and implements data sampling process 710, which is representative of the processes to sample and analyze outputs of a data pipeline discussed with respect to the preceding Figures. For example, data sampling process 710 may be representative of process 200 illustrated in FIG. 2 and/or the exemplary operation of environment 400 illustrated in FIG. 5. When executed by processing system 705, software 703 directs processing system 705 to operate as described herein for at least the various processes, operational scenarios, and sequences discussed in the foregoing implementations. Computing system 701 may optionally include additional devices, features, or functionality not discussed here for purposes of brevity.

Processing system 705 may comprise a micro-processor and other circuitry that retrieves and executes software 703 from storage system 702. Processing system 705 may be implemented within a single processing device but may also be distributed across multiple processing devices or sub-systems that cooperate in executing program instructions. Examples of processing system 705 include general purpose central processing units, graphical processing units, application specific processors, and logic devices, as well as any other type of processing device, combinations, or variations thereof.

Storage system 702 may comprise any computer readable storage media that is readable by processing system 705 and capable of storing software 703. Storage system 702 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 702 may also include computer readable communication media over which at least some of software 703 may be communicated internally or externally. Storage system 702 may be implemented as a single storage device but may also be implemented across multiple storage devices or sub-systems co-located or distributed relative to each other. Storage system 702 may comprise additional elements, such as a controller, capable of communicating with processing system 705 or possibly other systems.

Software 703 (data sampling process 710) may be implemented in program instructions and among other functions may, when executed by processing system 705, direct processing system 705 to operate as described with respect to the various operational scenarios, sequences, and processes illustrated herein. For example, software 703 may include program instructions for sampling a data set, generating a quality score for the data set based on the sample, and generating a confidence metric for the quality score based on the sample size as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 703 may include additional processes, programs, or components, such as operating system software, virtualization software, or other application software. Software 703 may also comprise firmware or some other form of machine-readable processing instructions executable by processing system 705.

In general, software 703 may, when loaded into processing system 705 and executed, transform a suitable apparatus, system, or device (of which computing system 701 is representative) overall from a general-purpose computing system into a special-purpose computing system customized to sample pipeline outputs as described herein. Indeed, encoding software 703 on storage system 702 may transform the physical structure of storage system 702. The specific transformation of the physical structure may depend on various factors in different implementations of this description. Examples of such factors may include, but are not limited to, the technology used to implement the storage media of storage system 702 and whether the computer-storage media are characterized as primary or secondary storage, as well as other factors.

For example, if the computer readable storage media are implemented as semiconductor-based memory, software 703 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 704 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples provided herein are described in the context of computing devices sample and analyze data outputs of a data pipeline, it should be understood that the systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A data pipeline monitoring system configured to sample data outputs of a data pipeline, the data pipeline monitoring system comprising:
    data monitoring circuitry configured to:
        monitor the data pipeline wherein the data pipeline receives an input data set, processes the input data set, and responsively generates and transfers an output data set;
        ingest the output data set;
        query a cloud computing service to determine an amount of available computing resources to process the output data set;
        host a data structure that correlates amounts of available computing resources to output data set sample sizes;
        input the amount of available computing resources into the data structure to determine a sample size for the output data set;
        sample data values from the output data set based on the sample size;
        utilize the available computing resources to process the sampled data values to determine a data quality score for the output data set;
        host another data structure that correlates the output data set sample sizes to confidence scores for data quality scores;
        input the sample size into the other data structure to determine a confidence score for the data quality score; and
        report the quality score and the confidence score.

2. The data pipeline monitoring system of claim 1 wherein the data monitory circuitry is further configured to:
    query the cloud computing service to determine an increased amount of computing resources are available to process the output data set;
    input the increased amount of available computing resources into the data structure to determine an increased sample size for the output data set;
    sample additional data values from the output data set based on the increased sample size;
    utilize the increased amount available computing resources to process the sampled data values and additional data values to determine an updated data quality score for the output data set;
    input the increased sample size into the other data structure to determine an updated confidence score for the updated data quality score; and
    report the updated quality score and the updated confidence score.

3. The data pipeline monitoring system of claim 1 wherein the data monitoring circuitry is configured to utilize the available computing resources to compare the sampled data values to expected data values, determine a similarity between the sampled data values and the expected data values based on the comparison, and determine the data quality score based on the similarity.

4. The data pipeline monitoring system of claim 1 wherein the data monitoring circuitry is configured to query the cloud computing service to determine an amount of memory available to process the output data set.

5. The data pipeline monitoring system of claim 1 wherein the data monitoring circuitry is configured query the cloud computing service to determine processor load to process the output data set.

6. The data pipeline monitoring system of claim 1 wherein the data monitoring circuitry is configured to utilize the available computing resources to compare the sampled data values to a historical data set, determine consistency of the sampled data values based on the comparison, and determine the data quality score based on the consistency.

7. The data pipeline monitoring system of claim 1 wherein the data monitoring circuitry is further configured to receive an urgency indication; and wherein:
    the data monitoring circuitry is configured to input the amount of available computing resources and the urgency indication into the data structure to determine the sample size for the output data set.

8. A method of operating a data pipeline monitoring system to sample data outputs of a data pipeline, the method comprising:
    by data monitoring circuitry in the data pipeline monitoring system:
        monitoring the data pipeline wherein the data pipeline receives an input data set, processes the input data set, and responsively generates and transfers an output data set;
        ingesting the output data set;
        querying a cloud computing service to determine an amount of available computing resources to process the output data set;
        hosting a data structure that correlates amounts of available computing resources to output data set sample sizes;
        inputting the amount of available computing resources into the data structure to determine a sample size for the output data set;
        sampling data values from the output data set based on the sample size;
        utilizing the available computing resources to process the sampled data values to determine a data quality score for the output data set;
        hosting another data structure that correlates the output data set sample sizes to confidence scores for data quality scores;
        inputting the sample size into the other data structure to determine a confidence score for the data quality score; and
        reporting the quality score and the confidence score.

9. The method of claim 8 further comprising:
    querying the cloud computing service to determine an increased amount of computing resources are available to process the output data set;
    inputting the increased amount of available computing resources into the data structure to determine an increased sample size for the output data set;
    sampling additional data values from the output data set based on the increased sample size;
    utilizing the increased amount available computing resources to process the sampled data values and additional data values to determine an updated data quality score for the output data set;
    inputting the increased sample size into the other data structure to determine an updated confidence score for the updated data quality score; and reporting the updated quality score and the updated confidence score.

10. The method of claim 8 wherein utilizing the available computing resources to process the sampled data values to determine the data quality score for the output data set comprises utilizing the available computing resources to compare the sampled data values to expected data values, determining a similarity between the sampled data values and the expected data values based on the comparison, and determining the data quality score based on the similarity.

11. The method of claim 8 wherein querying the cloud computing service to determine the amount of available computing resources to process the output data set comprises querying the cloud computing service to determine an amount of memory available to process the output data set.

12. The method of claim 8 wherein querying the cloud computing service to determine the amount of available computing resources to process the output data set comprises querying the cloud computing service to determine processor load to process the output data set.

13. The method of claim 8 wherein utilizing the available computing resources to process the sampled data values to determine the data quality score for the output data set comprises utilizing the available computing resources to compare the sampled data values to a historical data set, determining a consistency of the sampled data values based on the comparison, and determining the data quality score based on the consistency.

14. The method of claim 8 further comprising receiving an urgency indication; and wherein:
inputting the amount of available computing resources into the data structure to determine the sample size for the output data set comprises inputting the amount of available computing resources and the urgency indication into the data structure to determine the sample size for the output data set.

15. A non-transitory computer-readable medium storing instructions to sample data outputs of a data pipeline, wherein the instructions, in response to execution by one or more processors, cause the one or more processors to drive a system to perform operations comprising:
monitoring the data pipeline wherein the data pipeline receives an input data set, processes the input data set, and responsively generates and transfers an output data set;
ingesting the output data set;
querying a cloud computing service to determine an amount of available computing resources to process the output data set;
hosting a data structure that correlates amounts of available computing resources to output data set sample sizes;
inputting the amount of available computing resources into the data structure to determine a sample size for the output data set;
sampling data values from the output data set based on the sample size;
utilizing the available computing resources to process the sampled data values to determine a data quality score for the output data set;
hosting another data structure that correlates the output data set sample sizes to confidence scores for data quality scores;
inputting the sample size into the other data structure to determine a confidence score for the data quality score; and
reporting the quality score and the confidence score.

16. The non-transitory computer-readable medium of claim 15, the operations further comprising:
querying the cloud computing service to determine an increased amount of computing resources are available to process the output data set;
inputting the increased amount of available computing resources into the data structure to determine an increased sample size for the output data set;
sampling additional data values from the output data set based on the increased sample size;
utilizing the increased amount available computing resources to process the sampled data values and additional data values to determine an updated data quality score for the output data set;
inputting the increased sample size into the other data structure to determine an updated confidence score for the updated data quality score; and
reporting the updated quality score and the updated confidence score.

17. The non-transitory computer-readable medium of claim 15 wherein utilizing the available computing resources to process the sampled data values to determine the data quality score for the output data set comprises utilizing the available computing resources to compare the sampled data values to a historical data set, determining a consistency of the sampled data values based on the comparison, and determining the data quality score based on the consistency.

18. The non-transitory computer-readable medium of claim 15 wherein querying the cloud computing service to determine the amount of available computing resources to process the output data set comprises querying the cloud computing service to determine an amount of memory available to process the output data set.

19. The non-transitory computer-readable medium of claim 15 wherein querying the cloud computing service to determine the amount of available computing resources to process the output data set comprises querying the cloud computing service to determine processor load to process the output data set.

20. The non-transitory computer-readable medium of claim 15, the operations further comprising:
receiving an urgency indication; and wherein:
inputting the amount of available computing resources into the data structure to determine the sample size for the output data set comprises inputting the amount of available computing resources and the urgency indication into the data structure to determine the sample size for the output data set.

* * * * *